United States Patent [19]

Goretta et al.

[11] 4,143,222

[45] Mar. 6, 1979

[54] METHOD OF CONTROLLING THE MOLECULAR WEIGHT OF VINYL CARBOXYLIC ACID-ACRYLAMIDE COPOLYMERS

[75] Inventors: Louis A. Goretta, Naperville; Robert R. Otremba, Chicago, both of Ill.

[73] Assignee: Nalco Chemical Company, Oak Brook, Ill.

[21] Appl. No.: 890,107

[22] Filed: Mar. 27, 1978

Related U.S. Application Data

[63] Continuation-in-part of Ser. No. 825,795, Aug. 18, 1977, abandoned.

[51] Int. Cl.² .................... C08F 220/06; C08F 222/38
[52] U.S. Cl. ..................................... 526/64; 526/240; 526/303
[58] Field of Search .......................... 526/64, 303, 240

[56] References Cited

U.S. PATENT DOCUMENTS

| 3,035,033 | 5/1962 | Schweitzer et al. | 526/64 |
| 3,658,772 | 4/1972 | Volk et al. | 526/303 |
| 3,872,063 | 3/1975 | Kim | 526/303 |
| 3,929,739 | 12/1975 | Barabas et al. | 526/303 |

*Primary Examiner*—Harry Wong, Jr.
*Attorney, Agent, or Firm*—John G. Premo; Robert A. Miller

[57] ABSTRACT

The molecular weight of acrylic acid-acrylamide copolymers can be controlled between the range of 3,000–300,000 by polymerizing an aqueous solution of these comonomers in a tube reactor at a pressure between 50–350 psig in the presence of a free radical catalyst and with the following reaction parameters being specified; monomer solids, initiation temperature, monomer pH, initiator concentration, acrylic acid-acrylamide monomer ratio, and residence time in the reactor.

5 Claims, No Drawings

METHOD OF CONTROLLING THE MOLECULAR WEIGHT OF VINYL CARBOXYLIC ACID-ACRYLAMIDE COPOLYMERS

This is a continuation-in-part of copending Ser. No. 825,795 filed Aug. 18, 1977 now abandoned.

INTRODUCTION

Water soluble vinyl carboxylic acid-acrylamide copolymers are used in many different industrial applications. They are useful as flocculating agents, agents for improving the fine and filler retention in papermaking operations, as scale inhibitors, as corrosion inhibitors and as thickening agents. In certain applications such as boiler scale control and dispersing agents for aqueous systems, it is desirable that the copolymers be of relatively low molecular weight, e.g. 3,000-300,000 and most preferably, about 5,000-50,000.

Acrylamide and vinyl carboxylic acids are most often polymerized using batch processes with the monomers being polymerized in dilute aqueous solutions. In other instances, the comonomers may be polymerized using a water-in-oil emulsion technique, e.g. see Vanderhoff, U.S. Pat. No. 3,284,393. When solution polymerizations or emulsion polymerizations are used as a technique for producing low molecular weight polymers, it is oftentimes difficult to control the molecular weight of the finished copolymers so that it stays below 300,000. This is so even when chain transfer agents such as thioglycolic acid are used. Unless great care is taken, the resultant copolymers will oftentimes have excessively high molecular weights which render them unsatisfactory for certain industrial applications of the type previously discussed.

If it were possible to control the molecular weight of vinyl carboxylic acid-acrylamide copolymers within the range of 3,000-300,000 so that these copolymers could be readily produced without significant molecular weight variation occurring, an advance in the art of polymerization would be afforded.

Also of benefit would be a polymerization method and system for producing vinyl carboxylic acid-acrylamide copolymers which was continuous, simple to operate, and utilized simple inexpensive equipment.

THE INVENTION

In accordance with the invention, there is provided an improved method for controlling the molecular weight of acrylamide-vinyl carboxylic acid copolymers within the range of 3,000-300,000 and preferably, within the range of 10,000-50,000. The vinyl carboxylic acids which are copolymerized with the acrylamide are represented by the following formula:

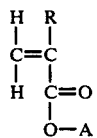

wherein R is H or $CH_3$ and A is selected from the group consisting of hydrogen or alkali metal ions. A preferred vinyl carboxylic acid is acrylic acid and its alkali metal salts. By the terms of this invention, it is also understood that when acrylamide is referred to in this invention is equally applicable to methacrylamide.

The method of this invention comprises the steps of polymerizing aqueous solutions of acrylamide with the vinyl carboxylic acid monomer as defined above continuously in an adiabatic packed tube reactor at a pressure of between 50-350 pounds per square inch gauge (psig) in the presence of a free radial catalyst. Sufficient pressure should be maintained in the tube reactor of this invention to maintain the reactants in a liquid state. By keeping the reaction conditions listed below within the limits specified, it is possible to carefully control the molecular weight of the aqueous copolymers which are produced continuously in aqueous solution.

| I. | Monomer solids | 5-50% by weight |
|---|---|---|
| II. | Initiation temperature | Room temp. - 250° F. |
| III. | Monomer pH | 2-6; |
| IV. | Initiator concentration | 0.5-30% by weight; |
| V. | Vinyl carboxylic acid-acrylamide weight ratio | 25/75-75/25; |
| VI. | Residence time | 1-15 min. |

The term, free radical catalyst, includes a wide variety of free radical catalysts. The preferred free radical catalysts used in the practice of the invention are the so-called redox catalysts which usually are a blend of a water-soluble persulfate and a water-soluble bisulfite. Less desirable free radical catalysts that may be used in the practice of the invention are the well-known hydroperoxides and the so-called azo catalysts such as azobisisobutyronitrile.

As will be shown hereinafter, all of the examples were performed in a 40″ long, ¾″ tubular reactor packed with glass beads. While the reaction conditions given specifically relate to that particular reactor, those skilled in the art will readily understand that when larger scale reactors are utilized, minor corresponding changes in these variables will have to be employed. As an example, in larger reactors where there would be less corresponding heat loss, it may be desirable to operate at a slightly lower temperature than that specified so as to more easily control the reaction. It is to be pointed out that we do not wish to be limited to the specific sized reactor which is discussed in the examples since it is readily apparent that the process described can be scaled up to much larger sized reactors using the parameters indicated.

To illustrate the many advantages of the invention, the following is presented by way of example:

EXAMPLE 1

| | Amount |
|---|---|
| Monomer Feed Solution | |
| Deionized water | 2,200 g |
| 50% NaOH solution | 510.8 g |
| Glacial acrylic acid | 469.6 g |
| Acrylamide solution (48.7%) | 415.8 g |
| Catalyst Solution No. 1 | |
| Deionized water | 140.0 g |
| Ammonium persulfate | 8.0 g |
| Catalyst Solution No. 2 | |
| Deionized water | 277.0 g |
| Sodium bisulfite | 24.0 g |

The above solutions would illustrate a typical sodium acrylate-acrylamide copolymer formulation. These solutions can be used to describe the technique involved with the continuous polymerization in a tube reactor.

The tube reactor consists of a stainless steel (No. 316) pipe, ¾″ in diameter and 40″ in length. The tube was packed with glass beads, 3-4 mm in diameter and had a void volume of 160 cc.

Lapp pulsa-feeder pumps were used for the monomer feed and catalyst solutions. For the above solutions, the following pumping rates were maintained.

Monomer Feed Solution — 38.5 cc/minute.
Catalyst Solution No. 1 — 1.5 cc/minute.
Catalyst Solution No. 2 — 3.0 cc/minute.

Before beginning an actual polymerization run, the back pressure regulator was pressurized with nitrogen. The pressure could be varied from 50-350 psig or higher depending on the anticipated temperature rise during the polymerization. Generally, a pressure in the range of 150-200 psig was found to be more than adequate for most of the experimental work. This back pressure was necessary in order to maintain a liquid phase during the polymerization reaction when temperatures would exceed the boiling point of water.

The run is begun when monomer feed and catalyst pumps are turned on simultaneously. When this occurs, the monomer feed solution is being pumped through a pre-heat section consisting of a 10 ft. coil of ¼" stainless steel (No. 316) tubing immersed in an oil bath set at a predetermined temperature. The pre-heater enables the monomer solution to be raised to the desired initiation temperature. As the monomer solution leaves the pre-heater, it immediately enters the static mixer at the same time that catalyst solutions No. 1 and 2 are being pumped into the system. The combined solutions enter the static mixer where an intimate mixing occurs. Some initiation may begin at this time. However, as the combined solutions enter the packed tube, the major portion of the polymerization reaction will occur and run to completion. This tube reactor section was covered with insulation to ensure adiabaticity. On the basis of the pumping rates previously described, the polymer solution has a four minute residence time in this reactor section. When the polymer solution leaves the reactor, the conversion should be high and the reaction completed.

Upon leaving the reactor, the polymer solution was cooled to room temperature in the chiller section. The chiller consisted of a 10 ft. coil of ¼" stainless steel (No. 316) tubing immersed in a cold water bath.

After the chiller, the final product was collected as an aqueous polymer solution.

Using the above procedure, a variety of tests varying various reaction conditions were performed and the results are set forth below:

| Effect of Monomer Solids: | | | |
|---|---|---|---|
| Example No. | Monomer Solids | /η/ | Molecular Weight |
| 2 | 5% | 3.4 | 300,000 |
| 3 | 10% | 1.85 | 216,000 |
| 4 | 12% | 1.69 | 193.000 |
| 5 | 20% | 1.19 | 110,000 |

| Effect of Initiation Temperature: | | | |
|---|---|---|---|
| Example No. | Temp. (° F) | /η/ | Molecular Weight |
| 6 | 150 | 0.26 | 3,300 |
| 7 | 180 | 0.97 | 64,000 |
| 8 | 250 | 0.85 | 48,800 |

| Effect of Monomer pH: | | | |
|---|---|---|---|
| Example No. | pH | /η/ | Molecular Weight |
| 9 | 6.0 | 0.37 | 13,700 |
| 10 | 4.2 | 0.49 | 22,700 |
| 11 | 2.3 | 0.36 | 12,400 |

| Effect of Initiator Concentration: | | | |
|---|---|---|---|
| Example No. | Initiator Conc.[1] | /η/ | Molecular Weight |
| 12 | 0.5% | 0.97 | 64,000 |
| 13 | 1.0% | 1.19 | 110,000 |
| 14 | 3.0% | 0.72 | 49,000 |
| 15 | 5.0% | 0.73 | 51,000 |
| 16 | 5.0% | 0.59 | 36,000 |
| 17 | 7.0% | 0.61 | 38,000 |
| 18 | 9.0% | 0.62 | 41,000 |
| 19 | 2.0% | 0.37 | 13,700 |
| 20 | 4.0% | 0.63 | 38,400 |
| 21 | 6.0% | 0.32 | 11,500 |

[1] Percent based on monomer solids.

| Effect of Acrylic Acid-Acrylamide Ratio: | | | |
|---|---|---|---|
| Example No. | Acrylic Acid to Acrylamide (Wt. Ratio) | /η/ | Molecular Weight |
| 22 | 75/25 | 0.66 | 41,300 |
| 23 | 50/50 | 0.345 | 13,800 |
| 24 | 25/75 | 0.33 | 10,700 |

| Effect of Residence Time: | | | |
|---|---|---|---|
| Example No. | Time (Minutes) | /η/ | Molecular Weight |
| 25 | 4 | 0.49 | 22,700 |
| 26 | 8 | 0.66 | 41,300 |
| 27 | 12 | 0.89 | 68,400 |

It is apparent from the above that the molecular weight of any particular copolymer can be varied by changing one or more of the above described reaction parameters. By selecting the particular parameter to be changed, it is possible to control with extreme accuracy the molecular weight of the finished copolymer.

Having thus described our invention, it is claimed as follows:

1. A method for preparing copolymers of acrylamide and vinyl carboxylic acids, said vinyl carboxylic acids having the formula prior to polymerization:

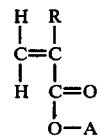

wherein R is H or $CH_3$ and A is selected from the group consisting of hydrogen or alkali metal ions, said method comprising the steps of polymerizing an aqueous solution of the vinyl carboxylic acid with acrylamide in an adiabatic packed tube reactor at a pressure of between 50-350 psig said pressure being sufficient to maintain the reactants in a liquid state in the presence of a free radical catalyst while maintaining the conditions of the reaction within the limits set forth below:

| I. | Monomer solids | 5-50% by weight |
|----|----------------|-----------------|
| II. | Initiation temperature | Room temp. - 250° F. |
| III. | Monomer pH | 2-6; |
| IV. | Initiator concentration | 0.5-30% by weight; |
| V. | Vinyl carboxylic acid-acrylamide weight ratio | 25/75-75/25; |
| VI. | Residence time | 1-15 min. | said copolymer of acrylamide and the vinyl carboxylic acid having a molecular weight of from 3,000 to 300,000.

2. The method of claim 1 wherein the free radical catalyst is a redox catalyst and the pressure of the reactor is within the range of 150-200 psig.

3. The method of claim 1 wherein the molecular weight of the acrylamide-vinyl carboxylic acid copolymer is 10,000-50,000.

4. The method of claim 1 where R is hydrogen.

5. The method of claim 1 where R is hydrogen and A is sodium.

* * * * *